June 20, 1961    O. G. NORTH    2,989,335
TREE TRANSPLANTER
Filed Dec. 30, 1959    2 Sheets-Sheet 1
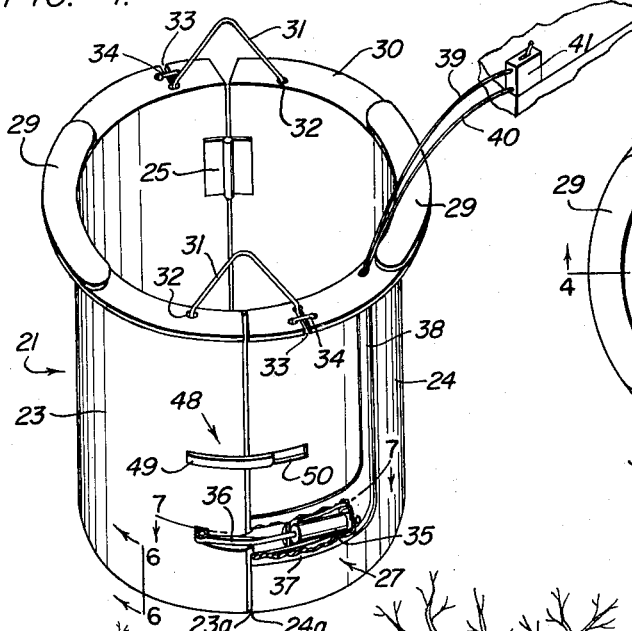
FIG. 1.
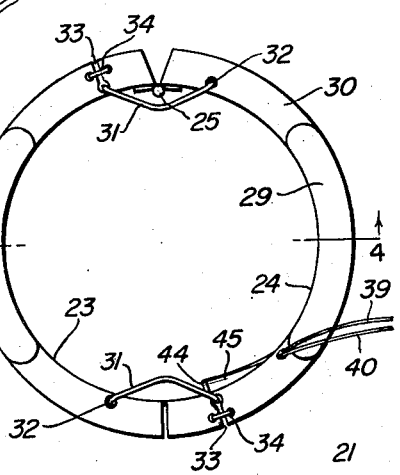
FIG. 2.
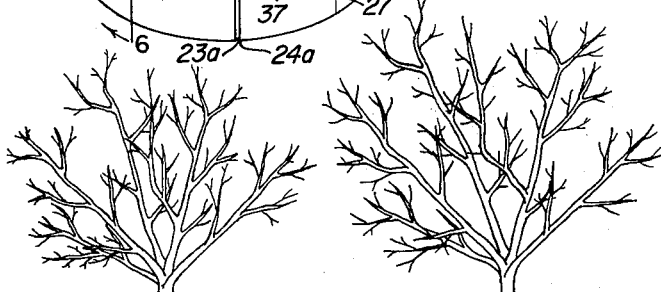
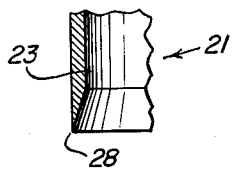
FIG. 6.
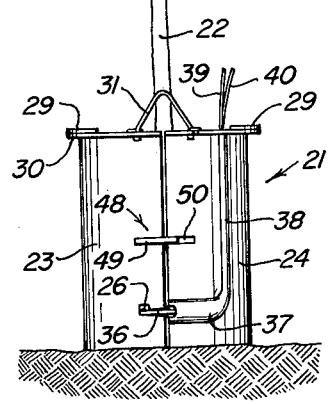
FIG. 3.
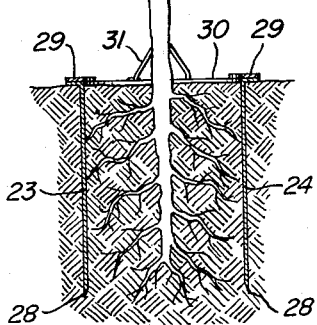
FIG. 4.
INVENTOR.
ORLIN G. NORTH
BY Mallinckrodt and
Mallinckrodt
ATTORNEYS June 20, 1961 O. G. NORTH 2,989,335
TREE TRANSPLANTER
Filed Dec. 30, 1959 2 Sheets-Sheet 2
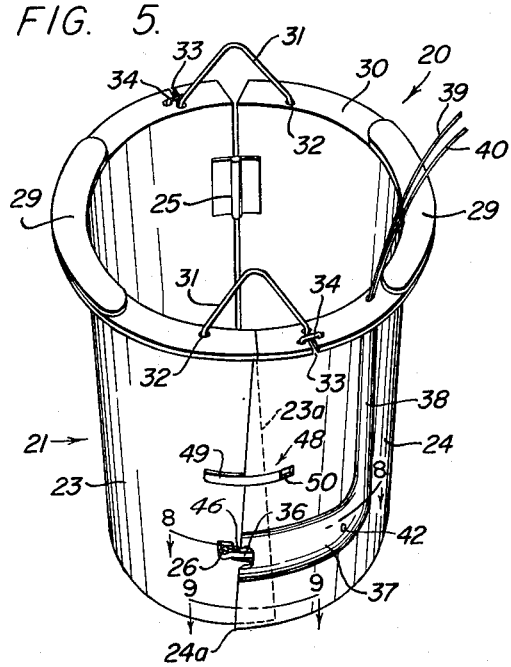
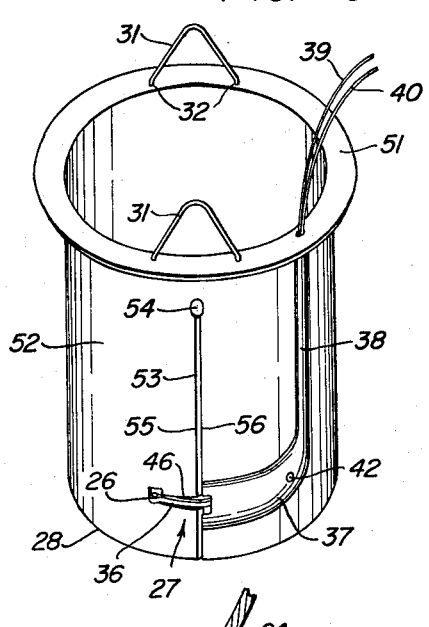
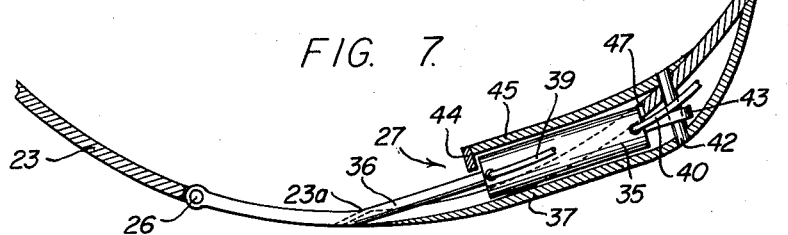
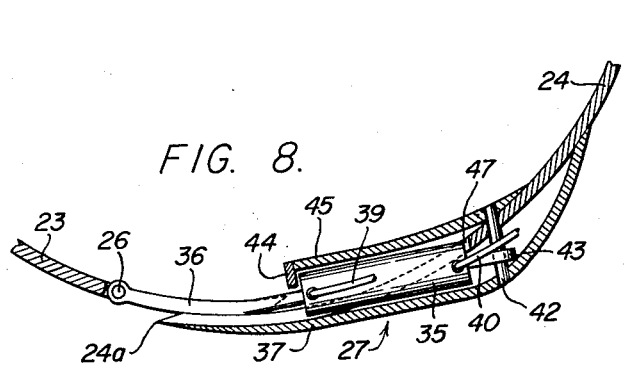
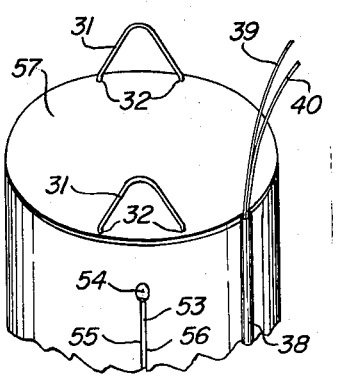
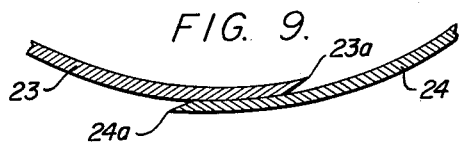
INVENTOR.
ORLIN G. NORTH
BY
ATTORNEYS

United States Patent Office 2,989,335
Patented June 20, 1961

1

2,989,335
TREE TRANSPLANTER
Orlin G. North, 2973 E. 3135 South, Salt Lake City, Utah
Filed Dec. 30, 1959, Ser. No. 863,006
6 Claims. (Cl. 294—50.7)

This invention relates to the transplanting of large trees and to the digging of holes for a variety of purposes. It is particularly directed to devices for holding a mass of earth about the roots of a tree as the tree is removed from the ground and for removing large masses of earth when making an excavation.

Prior devices of this type utilize open ended structures of large-diameter, tubular formation for encircling a major part of the root system of the tree to be transplanted, concentrically with its trunk. These devices as heretofore constructed have, however, imposed requirements such as the prior digging of an annular trench about the tree for placement of the structure, or the digging of a deep excavation at one side of the tree to facilitate prying out the structure and the tree it contains after it has been driven into place in the earth about the tree.

It is a principal object of this invention to eliminate these requirements by providing a device which may be driven down into the ground and then withdrawn vertically upwardly, carrying with it the earth, roots, tree, etc. comprehended thereby.

Features of the apparatus cooperating in the accomplishment of the above object are the provision of an open ended cylinder having a sharp lower edge, a slot extending vertically the overall height of the cylinder wall, and a double acting pressure fluid device adapted for drawing adjacent cylinder wall portions along the slot into overlapping relation. Another feature is relatively low placement of the pressure fluid device on the open ended cylinder in order to provide cylinder contraction which is most pronounced at the bottom thereof. The cylinder is thereby advantageously drawn into an inverted truncated cone tightly containing and compacting earth particularly in the bottom to provide generally successful separation from deeper supporting earth and more certain containment thereof.

A specific embodiment representing what is presently regarded as the best mode of carrying out the invention is illustrated in the accompanying drawings.

In the drawings:

FIG. 1 represents a perspective view of the tree transplanting apparatus with a housing compartment partially broken away to illustrate a pressure fluid power cylinder;

FIG. 2, a top plan view of the apparatus of FIG. 1;

FIG. 3, a side elevation of the apparatus of FIG. 1 in position at a tree ready to be driven into the ground about the tree roots;

FIG. 4, a vertical section taken along line 4—4 of FIG. 2, with the apparatus having been driven into the ground and showing earth and tree roots contained therein in corresponding vertical section;

FIG. 5, a perspective view similar to FIG. 1 with the apparatus contracted to an earth retaining state;

FIG. 6, a fragmentary vertical section taken on line 6—6 of FIG. 1 and drawn to an enlarged scale;

FIG. 7, a fragmentary horizontal section taken on line 7—7 of FIG. 1 and drawn to approximately the enlarged scale of FIG. 6;

FIG. 8, a similar fragmentary horizontal section taken on the line 8—8 of FIG. 5;

FIG. 9, a similar fragmentary horizontal section taken on line 9—9 of FIG. 5;

FIG. 10, a perspective view similar to FIG. 1, but illustrating a small tree or shrub transplanting apparatus; and FIG. 11, a fragmentary perspective view similar to FIG. 1, but illustrating apparatus similar to that of FIG. 10, which is adapted solely for digging, transporting and depositing earth.

Referring to the drawings:

My tree transplanting apparatus 20 comprises an open ended cylinder 21, see FIGS. 1 and 2, which may be driven from the position of FIG. 3 into the ground to a position about the main roots of a tree 22 as shown in FIG. 4. The cylinder 21 is advantageously made up of two semi-circular sections 23 and 24 hinged at 25 and adapted to be fastened together by a releasable connection at 26, FIGS. 1, 7, and 8, to facilitate placing the device about the trunk of a relatively large tree.

After the cylinder 21 has been driven into the ground a double acting pressure fluid device 27 is activated to draw the edges 23a and 24a of sections 23 and 24 into overlapped relation as shown in FIGS. 5, 8 and 9. This is arranged for the highest degree of overlap at the bottom of cylinder 21 and provides tight compaction of earth therein and thereby relatively easy separation of what is called a "ball" from supporting earth beneath as the cylinder 21, tree 22, and ball of earth therein contained are lifted vertically away. Thereafter, as long as pressure fluid actuated device 27 holds the lower portion of cylinder 21 and earth therein in a compacted state, loss of dirt is minimized. The cylinder and contents may be transported in this state and then, later, after the cylinder 21 has been spotted in a replanting hole or other desired location, the pressure fluid device 27 can be reverse actuated to shove the cylinder sections from the overlapped state, and, if necessary, even a little beyond, to release the ball of earth and the tree.

Cylinder section edges 23a and 24a, which form a slot extending up the cylinder wall from the lower open cylinder end, are advantageously beveled to ease cylinder contracting from the straight slot condition of FIG. 1 to the overlapped cylinder contracted state of FIG. 5.

Cylinder 21 is provided with a sharpened lower edge 28, as seen in FIG. 6, and also with reinforced driving pads 29 on flange 30 to facilitate driving of the cylinder down into the ground. Flange 30, which is in two sections corresponding to the cylinder sections 23 and 24, although shown to extend radially outwardly from the top of cylinder 21 could for most purposes just as conveniently extend inwardly. Cable loops 31 in the form of respective bails, fastened to the cylinder 21 through flange openings 32, provide convenient connecting means for a crane or hoist (not shown) which may be used for raising and lowering the apparatus. At least one of the openings 32 has a slot extension 33 which is closed by a hook 34 for quick unfastening and fastening of a cable loop 31 when placing the device about a tree trunk.

Pressure fluid actuated device 27 comprises a pressure fluid actuated double acting power cylinder 35, which is mounted on cylinder 21 at one side of the slot formed by edges 23a and 24a, and a cylinder output shaft 36. This shaft has a straight shank and a curved outer end, although in some units shaft 36 would be a straight shaft extending from the power cylinder to the releasable connection at 26. The apparatus is provided with a housing compartment 37 near the cylinder bottom for substantially containing the pressure fluid actuated device 27 particularly the power cylinder 35 portion thereof. This housing compartment 37 is so streamlined both to the inside and outside of cylinder section 24 and pressure fluid device 27 is so arranged as to facilitate the driving of cylinder 21 into the ground and subsequently withdrawal therefrom.

A bulged passage 38, which extends from housing compartment 37 up the cylinder 21 to and through flange 30 carries fluid pressure lines 39 and 40. These lines, which are connected to opposite ends of double acting power cylinder 35, are also connected to a fluid pressure source and return as controlled by valve 41 which is carried as a matter of convenience on a vehicle mounting the crane or hoist. Fuid power cylinder 35 is mounted within housing 37 by pin 42 which extends through the housing 37, cylinder 21 and through power cylinder flange 43. When pin 42 is removed, connection 26 released, and plate 44 removed from the inner portion 45 of housing 37, fluid power cylinder 35 may be withdrawn from housing 37. Fluid pressure lines 39 and 40 are flexible in order to facilitate replacement of the cylinder 35.

Cylinder section 23 has a slot 46, FIG. 5, which provides clearance for the output shaft 36 of pressure fluid device 27, and cylinder section 24 has an opening 47, which provides clearance for the power cylinder portion of the device. A tongue and groove arrangement 48, which interconnects cylinder sections 23 and 24, limits relative displacement of the sections longitudinally along edges 23a and 24a to thereby minimize side loading on the fluid actuated device 27. Tongue 49, which is fixed by welding or rivets to cylinder section 23, extends into groove 50 of cylinder section 24 to cooperate as a guide therewith for relative movement of the sections as edges 23a and 24a are moved to and from overlapped relation.

In the embodiment of FIG. 10, the apparatus is limited to digging and to the transplanting of small trees and shrubs around which it may be readily lowered from above in view of the fact that the cylinder upper flange 51 and the upper portion of cylinder 52 are continuous. The cylinder 52 has a slot 53 extending from the open bottom, which has sharp beveled edges extending upwardly almost to flange 51. Opening 54 at the top of slot 53 eliminates points of excess stress concentration as beveled slot edges 55 and 56 are moved to and from overlapping relation. Since the upper circular portion of the cylinder 52 is annularly continuous the tongue and groove arrangement 48, 49 used with the embodiment of FIG. 1 is not needed. Other details of this embodiment which perform substantially the same functions are numbered the same as in the embodiment of FIG. 1.

The embodiment of FIG. 11, although limited in general to digging and placing of earth, is substantially the same as the embodiment of FIG. 10 with the only major difference being that it has a top plate 57 in place of upper flange 51.

Whereas there are here illustrated and described certain preferred constructions which I presently regard as the best mode of carrying out my invention, it should be understood that various changes may be made without departing from the disclosed inventive subject matter particularly pointed out and distinctly claimed herebelow.

I claim:

1. Apparatus for transplanting trees and digging holes, comprising a cylinder having an open end adapted for being driven into the ground and having at least one slot extending up the cylinder from said open end; a pressure-fluid-actuated, extendable and retractable power device mounted on said cylinder outwardly and near the lower end thereof on one side of the slot and having an output member fastened to said cylinder on the other side of the slot for drawing slot edges and portions of the cylinder into overlapping relation which is most pronounced at the lower open end of the cylinder so that said cylinder assumes the shape of an inverted truncated cone; and a streamlined housing encasing said power device and blending into the outer wall surface of the cylinder.

2. The apparatus of claim 1, wherein the cylinder comprises, two semi-circular sections with edges joined together by connecting means at one side and with the other edges at the other side defining said slot; and wherein structural means is provided for guiding the opposing cylinder portions which define said slot while said portions are moved into and out of overlapping relation, said means comprising a tongue and groove arrangement wherein a tongue is fixed to one of the cylinder sections and wherein the tongue extends into a groove in the other cylinder section.

3. The apparatus of claim 2, including bails bridging respective sets of adjoining edges of the cylinder sections and having their ends pivotally attached to the upper ends of said sections; and means for releasing one end of that bail which bridges said slot.

4. The apparatus of claim 1, wherein the slot in said cylinder extends short of the upper end thereof and terminates in a curvaceous opening adapted for preventing concentration of excess stress in the cylinder as slot defining portions are moved into and out of overlapping relation.

5. The apparatus of claim 1, wherein the power device includes pressure-fluid supply lines leading downwardly from the upper end of the cylinder and outwardly of the latter; and wherein the streamlined housing includes a portion extending upwardly with and encasing said supply lines.

6. The apparatus of claim 1, including impact pads secured to the upper end of the cylinder in substantially diametrically opposite positions at respectively opposite sides of the slot.

References Cited in the file of this patent

UNITED STATES PATENTS

| | | |
|---|---|---|
| 175,745 | Perry | Apr. 4, 1876 |
| 509,487 | Paulson | Nov. 28, 1893 |
| 570,810 | Meier | Nov. 3, 1896 |
| 1,038,924 | Matthews | Sept. 17, 1912 |
| 2,014,311 | Council | Sept. 10, 1935 |
| 2,035,980 | Pope | Mar. 31, 1936 |
| 2,219,690 | Leydecker | Oct. 29, 1940 |
| 2,863,258 | Gish | Dec. 9, 1958 |
| 2,864,582 | Hall | Dec. 16, 1958 |